United States Patent
Ebina

(10) Patent No.: US 7,018,193 B2
(45) Date of Patent: Mar. 28, 2006

(54) DIE FOR MOLDING DISC SUBSTRATES

(75) Inventor: Toshiyuki Ebina, Aichi-ken (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 0 days.

(21) Appl. No.: 10/830,070

(22) Filed: Apr. 23, 2004

(65) Prior Publication Data

US 2004/0228940 A1    Nov. 18, 2004

(30) Foreign Application Priority Data

May 15, 2003    (JP)    ............................ 2003-137247

(51) Int. Cl.
B29D 11/00    (2006.01)

(52) U.S. Cl. .................. 425/192 R; 425/542; 425/810

(58) Field of Classification Search ................ 425/190, 425/192 R, 542, 810; 264/1.33, 106, 107
See application file for complete search history.

(56) References Cited

U.S. PATENT DOCUMENTS

| | | | | |
|---|---|---|---|---|
| 4,447,381 A | * | 5/1984 | Matey | 264/107 |
| 4,532,095 A | * | 7/1985 | McNeely | 264/107 |
| 5,849,225 A | * | 12/1998 | Ebina | 264/40.5 |
| 2004/0191352 A1 | * | 9/2004 | Koyama et al. | 425/406 |

FOREIGN PATENT DOCUMENTS

| | | |
|---|---|---|
| JP | 62-80620 | 5/1987 |
| JP | 3032851 | 10/1998 |
| JP | 10-302328 | * 11/1998 |

OTHER PUBLICATIONS

Computer translation of JP 10-302328.*
Patent Abstracts of Japan, 05-054427, Mar. 5, 1993, Optical Disk Base Plate And Its Molding Die.
Patent Abstracts of Japan, 10-302328, Apr. 28, 1997, Optical Disk Molding Device, Stamper Disposed At Otical Disk Molding Device And Optical Disk Molded By Optical Disk Molding Device.

* cited by examiner

Primary Examiner—Donald Heckenberg
(74) Attorney, Agent, or Firm—Browdy and Neimark, PLLC

(57) ABSTRACT

A die for molding disc substrates, includes, in a stamper, a to-be-held surface that diverges continuously from an inner circumferential surface of a center hole. An inner stamper holder holding the inner circumferential side of the stamper includes a cylindrical body and a claw including a cavity forming surface substantially parallel to the inner circumferential side head surface, and a holding surface diverging tapered toward the cavity holding the to-be-held surface. In the cylindrical body portion, a cylindrical surface that is opposed to the inner circumferential surface of the stamper. The die prevents the claw of the inner stamper holder from projecting from a transfer surface of the stamper and solves a problem of insufficient strength of the inner circumferential side of the stamper.

3 Claims, 2 Drawing Sheets

DIE FOR MOLDING DISC SUBSTRATES

BACKGROUND OF THE INVENTION

1. Field of the Invention

The present invention relates to a die for molding disc substrates such as CD-ROM, CD-R, DVD-ROM, DVD-RAM, DVD-R substrates and so on and, in particular, it relates to a stamper and an inner stamper holder.

2. Description of the Related Art

Conventionally, in a die for molding disc substrates, an inner stamper holder for holding an inner circumferential side of a stamper, of the construction as shown in [0003] and FIGS. 16 and 17 of Japanese Unexamined Patent Publication No. H05-54427, is typically used. Thus, the inner circumferential side of the stamper is held to a mirror plate by a claw portion of the inner stamper holder that is projected from a surface of the stamper toward a cavity. However, the inner stamper holder, shown in FIGS. 16 and 17 of Japanese Unexamined Patent Publication No. H05-54427 mentioned above, has a problem in that the flow of melted resin from a sprue toward an information recording surface of the stamper in the cavity is restricted by the claw portion mentioned above, which reduces the cross-sectional area of the cavity.

In order to solve this problem, in Japanese Unexamined Patent Publication No. H05-54427 mentioned above, as shown in [0030], [0031] and FIG. 8 thereof, the inner circumferential side of the stamper is shaped to diverge in a tapered fashion by an angle ranging from 20° to 70° and the claw portion of the inner stamper holder is shaped accordingly. By shaping these elements as described above, there is an effect that the claw portion is prevented from being projected from the information recording surface of the stamper toward the cavity so that the flow of the melted resin is not obstructed. Further, Japanese Unexamined Patent Publication No. H05-54427 describes that a combination of the inner circumferential side of the stamper and the claw portion of the inner stamper holder, shown in [0032] and FIG. 9 thereof, also has an effect similar to that described above.

Still further, as examples similar to those described above in Japanese Unexamined Patent Publication No. H05-54427, examples shown in [0013] and FIG. 4 of Japanese Unexamined Patent Publication No. H10-302328 and in FIGS. 5 and 6 of Japanese Unexamined Utility Model Publication No. S62-80620, are known.

In each of the examples described above in Japanese Unexamined Patent Publication No. H05-54427, Japanese Unexamined Patent Publication No. H10-302328 and Japanese Unexamined Utility Model Publication No. S62-80620, the inner circumferential side of the stamper must be formed to a specific shape. Further, considering the fact that the stamper is moved slightly because of the difference of thermal expansion between the stamper and the inner stamper holder and the pressure of the melted resin when the disc substrates are molded, as the inner circumferential side of the stamper is fitted completely under the claw portion of the inner stamper holder in the examples described above, there is a problem in that strength of the inner circumferential side of the stamper becomes insufficient and that the service life of the stamper is shortened.

Further, devices for forming a center hole of the stamper shown in FIGS. 1 and 4 of Japanese Registered Utility Model No. 3032851, which form configurations around the center hole of the stamper as shown in FIGS. 3(b) and 5(b) thereof, are known. However, it was thought absolutely impossible to hold the stamper so that the claw portion of the inner stamper holder is not projected toward the cavity and without reshaping the configurations around the center hole of the stamper and, therefore, no attempt has been made to address this problem.

BRIEF SUMMARY OF THE INVENTION

In order to solve the above problems, it is an object of the present invention to provide a die, for molding disc substrates and aimed at improving the flow of melted resin, that prevents a claw portion of an inner stamper holder from being projected from a transfer surface of a stamper toward a cavity and solves the problem of insufficient strength of an inner circumferential side of the stamper.

Thus, according to the present invention, there is provided a die for molding disc substrates in which a stamper is held by at least one of a stationary die and a movable die, wherein, in the stamper, a to-be-held surface that diverges continuously from an inner circumferential surface of a center hole is formed between the inner circumferential surface and an inner circumferential side head surface by punching the center hole, an inner stamper holder that holds the inner circumferential side of the stamper is comprised of: a cylindrical body portion; and a claw portion formed around an outer circumference of an end of the cylindrical body portion, in the claw portion, a cavity forming surface that is substantially parallel to the inner circumferential side head surface and a holding surface that diverges toward the cavity in a tapered fashion and holds said to-be-held surface are formed, and, in the cylindrical body portion, a cylindrical surface that is equidistantly substantially opposed to the inner circumferential surface of the stamper, is formed.

DETAILED DESCRIPTION OF THE INVENTION

Figure 1:
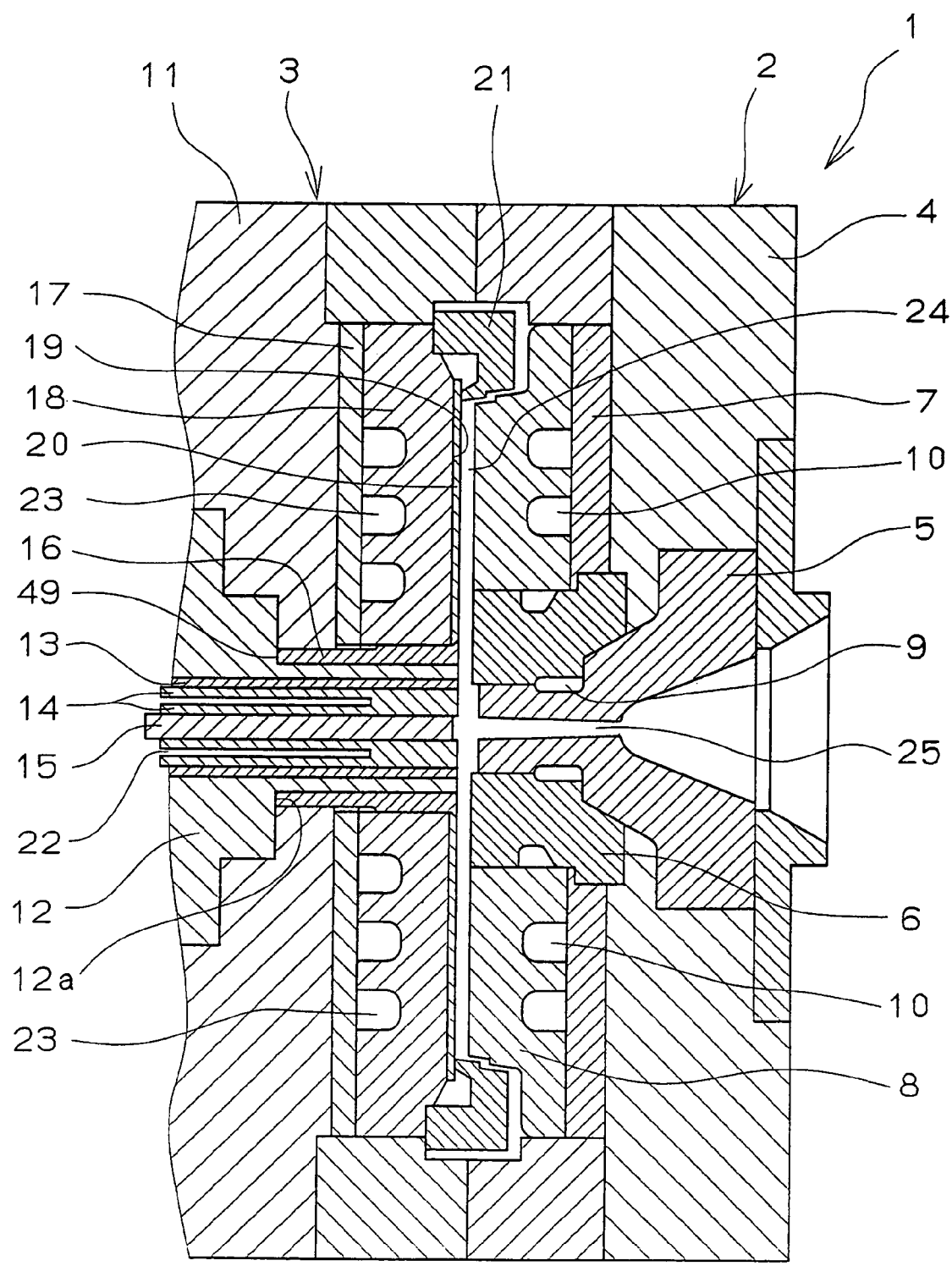
FIG. 1 is a cross-sectional view of a die for molding disc substrates according to the present invention.

In FIG. 1, a die 1 for molding disc substrates is comprised of: a stationary die 2 that is attached to a stationary platen of a disc substrate molding apparatus (not shown); and a movable die 2 that is attached to a movable platen. In the stationary die 2, a main body portion 4 is provided with a sprue bush 5, a female cutter 6, a back plate 7 and so on and a mirror plate 8 is disposed on the back plate 7. Further, a sprue temperature control path 9 is formed between the sprue bush 5 and the female cutter 6 and a spiral mirror plate temperature control path 10 is formed between the back plate 7 and the mirror plate 8.

On the other hand, in the movable die 3, a main body portion 11 is provided with a cylindrical stationary sleeve 12 and an ejector sleeve 13, a male cutter 14 and a center pin 15 are disposed in the center hole of the stationary sleeve 12. Then, an inner stamper holder 16 can be mounted around the stationary sleeve 12. Further, a back plate 17 is disposed on said main body portion 11, and around the outside of said inner stamper holder 16 and a mirror plate 18 is disposed on the back plate 17. In this embodiment, the mirror plate 18 has a thickness of 20 mm. A stamper 20, the inner circumferential side 20a of which is held by said inner stamper holder 16 and the outer circumferential side of which is held by an outer circumferential stamper holder 21, respectively, is mounted on a surface 19 of the mirror plate 18. Further, a male cutter temperature control path 22 is formed inside the male cutter 14 and a plurality of circular mirror plate temperature control paths 23 are formed between the back plate 17 and the mirror plate 18. In this embodiment, elements constituting the die such as the mirror plate 18, the inner stamper holder 16 and the like are made of 13 Cr stainless steel containing chromium or, more specifically, SUS420J2 having a thermal expansion coefficient of about 11.5×10$^{-6}$/° C.

Then, a cavity 24 having a variable volume is formed by fitting an outer circumferential portion of the mirror plate 8 of said stationary die 2 into an inner circumferential portion of the outer stamper holder 21 of said movable die 3. A sprue 25 is formed in the center of said sprue bush 5 and passes through the cavity 24 so that melted resin can be injected from an injection device (not shown) via said sprue 25 to fill the cavity 24.

Figure 2:
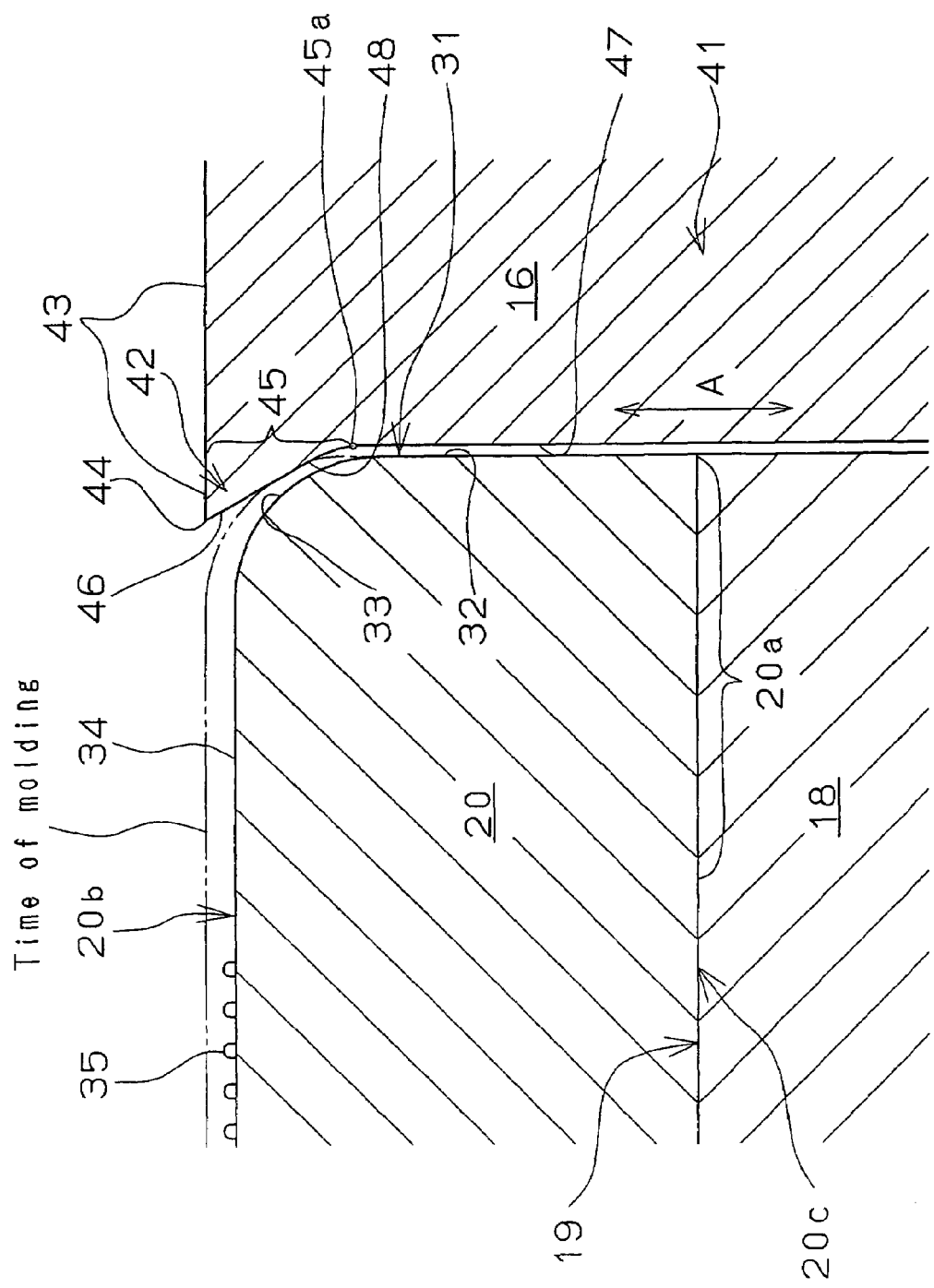
FIG. 2 is an enlarged cross-sectional view of an important part of the die for molding disc substrates shown in FIG. 1.

Next, the stamper 20 used in the present invention will be described with reference to FIG. 2. The stamper 20 is formed of nickel or nickel alloys having a thermal expansion coefficient of about 12.8×10$^{-6}$/° C. A center hole 31 of the stamper 20 is formed by punching from the side of a head surface 20b or a transfer surface 35 toward a back surface 20c thereof, as described in said Japanese Registered Utility Model No. 3032851. As shown in FIG. 2, in the centerhole 31 of the stamper 20 that is formed by punching, an inner circumferential surface 32 that is perpendicular to the head surface 20b and the back surface 20c and a to-be-held surface 33 that diverges continuously from said inner circumferential surface 32 toward the surface 20b are formed. Then, on the head surface 20b of the stamper 20, an inner circumferential side head surface 34 and the transfer surface 35 are formed continuously from said to-be-held surface 33.

In the present invention, as the to-be-held surface 33 that diverges continuously from the inner circumferential surface 32 can be formed by punching, the special processing to allow the inner stamper holder 16 to hold the inner circumferential side 20a of the stamper 20 as described above in Japanese Unexamined Patent Publication No. H05-54427, Japanese Unexamined Patent Publication No. H10-302328 and Japanese Unexamined Utility Model Publication No. S62-80620 is not necessary. In this connection, when the center hole 31 of the stamper 20 is formed by punching, burrs are formed on the back surface 20c of the stamper 20 and, if the burrs obstruct the attachment of the stamper 20, the burrs should be removed by polishing. If the burrs are too small to obstruct the attachment of the stamper 20, an annular groove may be formed inside the mirror plate 18 so as to insert the burrs. Here, it is to be noted that the stamper 20 is not limited to that described above, in which the to-be-held surface 33 is formed by punching the center hole 31, and the to-be-held surface 33 may be formed by separate processing. In any case, in the stamper 20 of the present invention, the to-be-held surface 33 that diverges between the inner circumferential surface 32 and the inner circumferential side head surface 34 is formed and the inner circumferential side 20a of the stamper 20 has a specified thickness. Therefore, in contrast to the stampers in which the entire inner circumferential portion is formed in a tapered fashion or a thin walled portion is formed as described above in Japanese Unexamined Patent Publication No. H05-54427, Japanese Unexamined Patent Publication No. H10-302328 and Japanese Unexamined Utility Model Publication No. S62-80620, the inner circumferential side 20a of the stamper 20 is not likely to be damaged.

Next, the inner stamper holder 16 to hold the inner circumferential side 20a of the stamper 20 will be described with reference to FIG. 2. The inner stamper holder 16 is a member that has a specified length in the direction of the axis line A and a cylindrical body portion 41 of the inner stamper holder 16 has a claw portion 42 on the outer circumference at the end facing the cavity. The end face of the cylindrical body portion 41 and the claw portion 42 facing the cavity constitutes a cavity forming surface 43 that is substantially parallel to the surface 34 of the held stamper 20, adjacent to the inner circumferential surface.

The cavity forming surface 43 at the claw portion 42 is configured so that its outer circumferential portion 44 is projected from a cylindrical surface 47 of the cylindrical body portion 41 in the direction perpendicular to the axis line A by 50 μm at room temperature (20° C.). Further, the dimension of a base portion 45 of the claw portion 42 in the direction of the axis line A, which corresponds to a boundary portion between the cylindrical body portion 41 of the inner stamper holder 16 and the claw portion 42, is 100 μm at room temperature. The claw portion 42 is formed so that it is connected with the cylindrical body portion 41 at a connection point 45a on said base portion 45 on the side opposite to the cavity. Then, a holding surface 46 is formed so that it diverges in a tapered fashion toward the cavity so as to connect the connection point 45a on said base portion 45 with the outer circumferential portion 44 of the cavity-forming surface 43. Then, a connecting surface 48 having a concave arcuate cross section is formed on the holding surface 46 on the side opposite to the cavity so that the holding surface 46 is connected to the cylindrical surface 47 smoothly at the connection point 45a on the base portion 45. Thus, the majority of said holding surface 46 consists of a tapered surface and is connected to the cylindrical surface 47 via the connecting surface 48. Further, said cylindrical surface 47 is formed perpendicularly to said cavity forming surface 43 to face the inner circumferential surface 32 of said stamper 20 equidistantly.

Therefore, according to the present invention, the to-be-held surface 33 of the stamper 20 that is formed by punching can be held by the holding surface 46 of the claw portion 42 that diverges in a tapered fashion and the flowability of resin can be improved without special processing of the to-be-held surface 33 of the stamper 20. Further, as the holding surface 46 of the claw portion 42 is formed so that it has an arcuate cross section, the damage of the inner circumferential side of the stamper 20 due to thermal expansion of the stamper 20 and the mirror plate 18 at the time of molding can be prevented further. Here, it is to be noted that the holding surface 46 may be formed so that it has a concave or convex arcuate cross section as a whole.

Then, the holding surface 46 of the claw portion 42 is nitrided so that a layer of chromium nitride is formed thereon. Though this chromium nitride layer is aiming at improving wear resistance, it is not essential to the present invention. The chromium nitride layer may also be formed on the cavity forming surface 43 and the cylindrical surface 47.

In this connection, it is desirable that the claw portion 42 is formed so that the outer circumferential portion 44 is projected from the cylindrical surface 47 of the cylindrical body portion 41 in the direction perpendicular to the axis line A by 30–60 im at room temperature. Further, it is desirable that the dimension of the base portion 45 of the claw portion 42 in the direction of the axis line A is 50–150 im at room temperature. Thus, by forming the claw portion 42 into the shape described above, the flowability of the resin can be improved and the melted resin can be prevented from flowing between the stamper 20 and the inner stamper holder 16 and forming burrs on molded substrates. In addition, the stamper 20 can be prevented from coming off and it is possible to increase the number of times that the inner stamper holder 16 and the stamper 20 can be used. Here, the connecting surface 48 having the arcuate cross section is not essential to the present invention. Though it is desirable that all the elements constituting the cavity forming surface 43 of the inner stamper holder 16 are disposed on an identical plane, the cavity forming surface 43 at the claw portion 42 may be disposed at a height that is slightly different from the cavity forming surface 43 at the cylindrical body portion 41 so long as the difference of the height does not obstruct the flow of the melted resin.

Next, an operation for attaching the stamper 20 and the inner stamper holder 16 to the movable die 3 will be described with reference to FIGS. 1 and 2. When the stamper 20 is attached to the mirror plate 18 of the movable die 3, first, the cylindrical body portion 41 of the inner stamper holder 16 is inserted through the center hole 31 of the stamper 20. Then, an end of the cylindrical body portion 41 of the inner stamper holder 16 on the side opposite to the cavity, around which the stamper 20 is inserted, is inserted into an annular clearance between the stationary sleeve 12 and the mirror plate 18. Then, an end face 49 of the inner stamper holder 16 on the side opposite to the cavity is positioned by using a rotating member (not shown) so that the end face 49 is held to an abutting surface 12a of the stationary sleeve 12. As a result of the above operation, the relative position of the inner stamper holder 16 is determined with respect to the mirror plate 18 and the stamper 20.

In this embodiment, the cavity forming surface 43 at the claw portion 42 of the inner stamper holder 16 is designed to be positioned so that it is projected with respect to the inner circumferential side head surface 34 of the attached stamper 20 toward the cavity by 15 im at room temperature (20° C.). This is because the thermal expansion of the mirror plate 18 and the stamper 20 at the time of molding is greater than that of the inner stamper holder 16. Thus, the cavity forming surface 43 at the claw portion 42 is designed to lie at the height substantially identical to that of the inner circumferential side head surface 34 of the stamper 20, adjacent to the inner circumferential surface at the time of molding, as indicated by a chain double-dashed line in FIG. 2. Though the height of the projection of the cavity forming surface 43 at the claw portion 42 with respect to the inner circumferential side head surface 34 of the stamper 20 may vary depending on the thickness of the mirror plate 18 and the stamper 20 and the temperature difference between the mirror plate 18 and the inner stamper holder 16 at the time of molding, it is typically designed to be projected toward the cavity or the other die by 5–25 im at room temperature and the difference in height stays within 10 im at the time of molding. Therefore, a step height on the molded products that is created between a surface formed by the inner circumferential surface of the stamper 20 and a surface formed by the cavity forming surface 43 of the inner stamper holder 16 can be eliminated or becomes very small.

Though an example in which the stamper 20 and the inner stamper holder 16 are provided in the movable die 3 are shown in the embodiment described above, the stamper 20 may be held by the inner stamper holder 16 in at least one of the stationary die 2 and the movable die 3. When the stamper 20 is held in the stationary die 2, the inner stamper holder 16 is attached between the female cutter 6 and the mirror plate 8.

Next, an operation for molding disc substrates by using the disc substrate molding die 1 according to the present invention will be described. In this embodiment, it is assumed that DVD-R substrates are molded from polycarbonate resin and the temperature of the melted resin is about 360° C. at the nozzle when it is injected. Further, the temperature of the mirror plate 18 in the movable die 3 is controlled to about 120° C. by means of a temperature control media flowing through the mirror plate temperature control path 23 and the temperature of the inner stamper holder 16 is controlled to about 85° C. by means of a temperature control media flowing through the male cutter temperature control path 22. Therefore, as the expansion of the stamper 20 and the mirror plate 18 toward the cavity is greater than that of the inner stamper holder 16 toward the cavity, the inner circumferential side head surface 34 of the stamper 20 and the cavity forming surface 43 at the claw portion 42 of the inner stamper holder 16 lie at a substantially identical height at the time of molding. At this time, as the holding surface 46 diverges in a tapered fashion toward the cavity and, on the side of the base portion 45, the connecting surface 48 having the arcuate cross section is formed to be connected with the cylindrical surface 47, the inner circumferential side 20a of the stamper 20 is not damaged even if the stamper 20 expands. Further, the distance between the holding surface 46 of the inner stamper holder 16 and the to-be-held surface 33 of the stamper 20 is maintained to be sufficiently small to prevent the inflow of the melted resin.

Then, when the melted resin is injected from the injection device (not shown), via the sprue, to fill the cavity 24, as the claw portion 42 of the inner stamper holder 16 is not projected toward the cavity, the cross-sectional area where the melted resin flows is increased so that the cavity 24 can be filled with the melted resin satisfactorily. Further, according to the present invention, surfaces of the disc substrates on the side of the stamper (surfaces on which signals are recorded) can be molded flat. Therefore, when substrates such as CD-ROM, CD-R substrates, and the like, are molded, decorations and the like can be printed on the entire surface of the disc substrates. Further, when substrates such as DVD-R substrates, and the like, are molded, a pair of disc substrates can be bonded together over the entire surfaces.

What is claimed is:

1. A die for molding disc substrates in which a stamper is held by at least one of a stationary die and a movable die, wherein, in a said stamper,
a to-be-held surface that diverges continuously from an inner circumferential surface of a center hole is formed between said inner circumferential surface and an inner circumferential side head surface,
an inner stamper holder that holds the inner circumferential side of said stamper is comprised of:
a cylindrical body portion; and a claw portion formed around an outer circumference of an end of said cylindrical body portion, and
in said claw portion,
a cavity forming surface which is substantially parallel to the inner circumferential side head surface of said stamper and on which an outer circumferential portion is formed so that it is projected from a cylindrical surface of said cylindrical body portion in a direction perpendicular to an axis line by 30–60 μm at room temperature, and
a holding surface which has a base portion having a dimension of 50–150 μm in the axial direction at room temperature and which diverges from a connection point on said base portion toward said outer circumferential portion of said cavity forming surface in a tapered fashion are formed.

2. A die for molding disc substrates according to claim 1, wherein the cavity forming surface of the claw portion of said inner stamper holder is projected with respect to the inner circumferential side head surface of the stamper toward the cavity by 5–25 μm at room temperature.

3. A die for molding disc substrates according to claim 1, wherein the holding surface of the claw portion of said inner stamper holder is formed to have an arcuate cross section.

* * * * *